United States Patent [19]
Meline

[11] Patent Number: 5,824,136
[45] Date of Patent: Oct. 20, 1998

[54] PROCESS FOR THE PURIFICATION OF A GAS BY SCRUBBING — VENTURI COLUMN FOR CARRYING OUT SAID PROCESS

[75] Inventor: François Meline, Paris, France

[73] Assignee: Societe Generale Pour les Techniques Nouvelles SGN, France

[21] Appl. No.: 602,858

[22] PCT Filed: Sep. 9, 1994

[86] PCT No.: PCT/FR94/01064

§ 371 Date: Feb. 28, 1996

§ 102(e) Date: Feb. 28, 1996

[87] PCT Pub. No.: WO95/07132

PCT Pub. Date: Mar. 16, 1995

[30] Foreign Application Priority Data

Sep. 10, 1993 [FR] France .................................. 93 10769

[51] Int. Cl.[6] .................................................. B01D 51/08
[52] U.S. Cl. .................................. 95/29; 55/277; 55/318; 95/30; 96/175
[58] Field of Search .................................. 55/257.7, 277, 55/318, 338; 95/29, 30, 156; 96/175

[56] References Cited

U.S. PATENT DOCUMENTS

| | | |
|---|---|---|
| 2,935,375 | 5/1960 | Boucher ........................................ 95/29 |
| 3,172,744 | 3/1965 | Fortman et al. ........................... 55/277 |
| 3,763,634 | 10/1973 | Alliger . |
| 3,894,851 | 7/1975 | Gorman ...................................... 55/277 |
| 4,210,428 | 7/1980 | Schneider et al. . |
| 5,197,399 | 3/1993 | Mansour . |

FOREIGN PATENT DOCUMENTS

| | | |
|---|---|---|
| 655720 | 1/1963 | Canada ...................................... 55/277 |
| 0243203 | 11/1987 | European Pat. Off. . |
| 462867 | 5/1975 | U.S.S.R. ..................................... 95/29 |

OTHER PUBLICATIONS

IEEE Transactions On Ultrasonics Engineering, vol. UE–10 No. 2, pp. 91–95, Sep. 1963.

*Primary Examiner*—C. Scott Bushey
*Attorney, Agent, or Firm*—Bierman, Muserlian and Lucas

[57] ABSTRACT

Gas which is contaminated with liquid and/or solid is purified using a vertically oriented Venturi column in conjunction with a sound field. At the throat of the Venturi column, a scrubbing liquid is atomized and injected in a direction substantially perpendicular to the flow of the contaminated gas. A sound field is generated at the throat in order to cause the contaminate to shift relative to the vesicles of the scrubbing liquid.

16 Claims, 7 Drawing Sheets

FIG_2

FIG_3

FIG_4

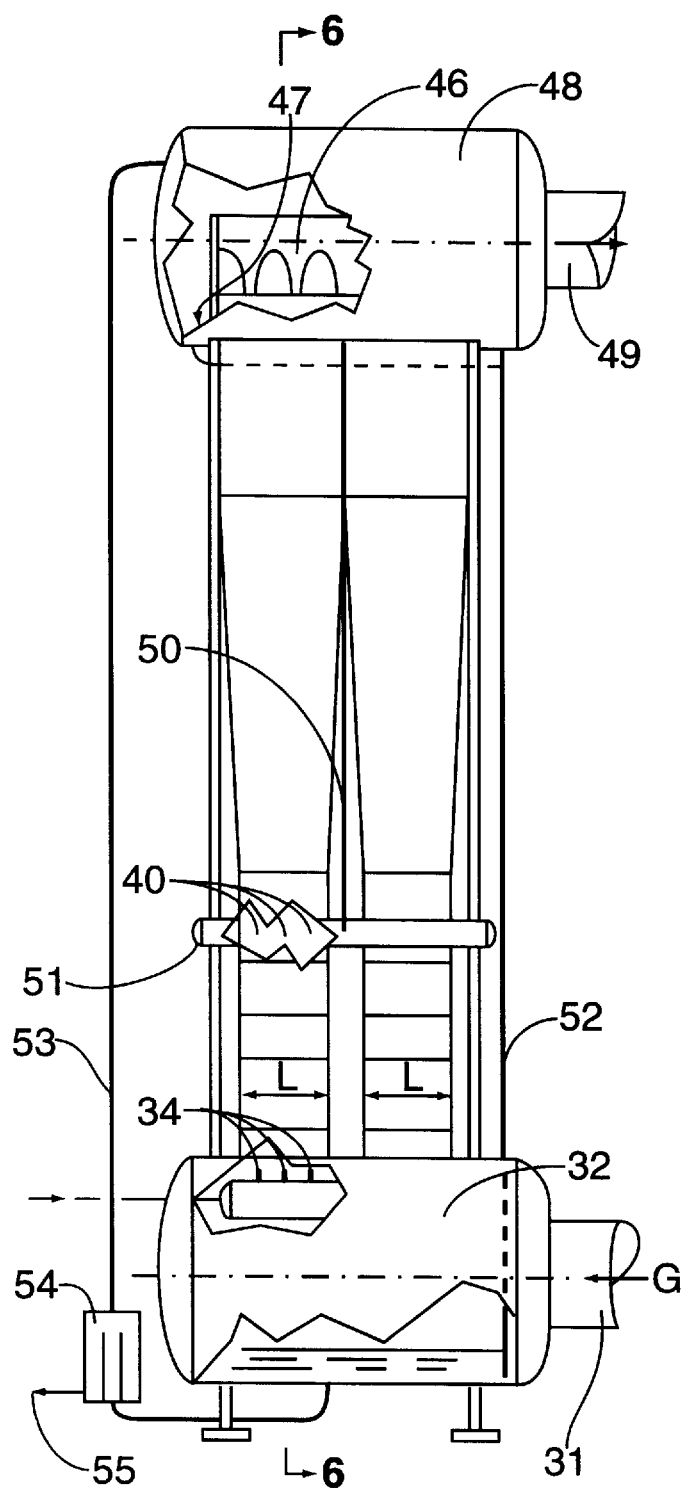
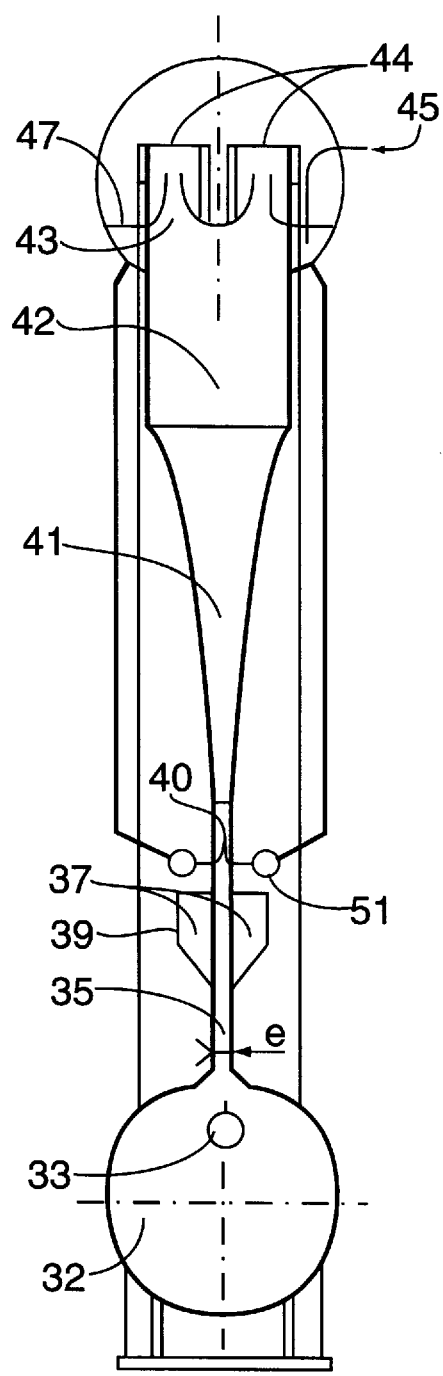
FIG. 5
FIG. 6

PROCESS FOR THE PURIFICATION OF A GAS BY SCRUBBING — VENTURI COLUMN FOR CARRYING OUT SAID PROCESS

BACKGROUND OF THE INVENTION

1. Field of the Invention

The present invention relates to a process for the purification of a gas by scrubbing and to a device, namely a vertical-axis Venturi column, for carrying out said process.

The present invention in fact constitutes an improvement to the scrubbing processes for the purification of gases contaminated by liquid and/or solid particles (aerosols), wherein a scrubbing liquid is atomized in co-current with the contaminated gas. The vesicles of said scrubbing liquid intercept the contaminating particles carried by said gas. Such processes have been carried out particularly in devices such as Venturi scrubbers or vertical-axis Venturi columns of circular cross-section. Said scrubbing liquid is injected into the gas to be purified, upstream of or at the entrance of the throat of the Venturi(s).

2. Description of Related Art

According to the prior art, processes for the purification of gases contaminated by liquid and/or solid particles, in a vertical-axis Venturi column, have been particularly described and carried out, said processes comprising:

- at the throat of a Venturi of circular cross- section, the pneumatic atomization of a scrubbing liquid in a rising stream of the gas to be purified, said scrubbing liquid being injected in a direction substantially perpendicular to that of said stream; and
- downstream of the throat of the Venturi, the elimination of the vesicles of scrubbing liquid entrained by said gas stream and laden with contaminants.

Elimination of the vesicles is understood as meaning any of the chemical engineering operations whose purpose is to eliminate from a gas at least some of the particles, in this case vesicles, suspended in said gas.

Such scrubbing processes for the purification of gases in a vertical-axis Venturi column equipped with a Venturi of circular cross-section are described in greater detail later on in the present text with reference to FIG. 1. As indicated above, the present invention constitutes an improvement to such processes.

According to the prior art, acoustic processes have also been proposed for the purification of gases contaminated by solid and/or liquid particles. The shifting of the contaminating particles which is due to the acoustic field causes two phenomena contributing to the purification of the gas:

- the disappearance of said particles by precipitation on the walls which limit the agglomeration volume; and
- the disappearance of the finest particles by collision with coarser particles in the case of a polydisperse aerosol. The resulting change in the size distribution of the aerosol affords a significant reduction in the component for which the conventional separation processes are the least effective.

There are very few industrial apparatuses which utilize such acoustic agglomeration. It is possible to mention a few applications, mainly on the pilot scale, in the world, and a few laboratory-scale embodiments in France, especially the one described by C. A. Stokes, Sonic agglomeration of carbon black aerosol, Chem. Eng. Progr. 46(8): pages 423–432(1950).

Acoustic agglomerators principally consist of a large coagulation chamber (6 to 9 m in height) in which the treated gases, circulating at low velocity (2 to 5 m/s), are subjected to the action of an acoustic wave emitted by a sonic generator, which is generally a siren in industrial applications and an electric loudspeaker in pilot plants. (The residence time of the gases inside said chamber must be sufficient.)

At the exit of the agglomeration chamber, where the acoustic conditioning takes place which increases the median diameter of the contaminating particles so as to facilitate their subsequent capture, the gases pass through a dust-eliminating or vesicle-eliminating device such as a cyclone, multicyclones, packed column or filter medium.

The phenomena of acoustic precipitation on the walls by means of a field with a high intensity of the order of $W/cm^2$ make a major contribution to the purification of the gases in this type of apparatus, mainly in the case of vesicle elimination by means of a packed bed, sieve or filter medium.

Inside an acoustic agglomeration chamber, it is possible to spray in countercurrent with the gas to be treated. In such a case, the drops of sprayed liquid entrain the contaminating particles which have previously been enlarged by acoustic agglomeration.

Such processes for the purification of gases by acoustic agglomeration of the contaminating particles they contain are described in greater detail later on in the present text with reference to FIG. 2.

Such acoustic processes have the following disadvantages:

- they involve a greater energy consumption than an electrofilter;
- their efficacy is negligible in the case of contamination by a monodisperse aerosol or an aerosol with a small standard deviation of the particle size distribution;
- the required acoustic intensity is high;
- the bulk of the device is considerable in view of the low velocity of circulation of the gases; and
- acoustic insulation is sometimes essential to prevent noise pollution.

SUMMARY OF THE INVENTION

According to the invention, the phenomena of acoustic agglomeration are utilized to advantage in a process of purification by scrubbing in a vertical-axis Venturi column.

Acoustic agglomeration is used synergistically with the phenomena of turbulent or brownian coagulation which take place in Venturi-type scrubbers, where the scrubbing liquid is atomized in the contaminated gas, advantageously in the form of a monodisperse aerosol of high numerical concentration (containing a large number of vesicles per unit volume).

The process of the invention therefore combines acoustic agglomeration with the scrubbing of a gas in a Venturi column by the pneumatic atomization of vesicles of the scrubbing liquid at the throat of the Venturi. Such a combination was not at all obvious insofar as it was established that the phenomena of sonic coagulation were found to be of interest only with long residence times ($\geq 1$ s) and also a relatively high applied acoustic intensity (about 1 $W/cm^2$).

Now, the acoustic agglomeration process of the invention improves a conventional process of purification by scrubbing in a Venturi column having residence times of the order of a few tenths of a second and by using a relatively low acoustic intensity (from 0.1 to 0.5 $W/cm^2$).

Said process according to the invention for the purification of gases contaminated by liquid and/or solid particles is therefore carried out in a vertical-axis Venturi column and comprises:

at the throat of a Venturi, the pneumatic atomization of a scrubbing liquid in the rising stream of gas to be purified, said liquid being injected in a direction substantially perpendicular to that of said stream; and downstream of said throat of the Venturi, the elimination of the scrubbing vesicles entrained by said gas stream and laden with contaminants.

Said process is characterized in that a sound (or acoustic) field is generated at said throat of the Venturi in order to cause the liquid and/or solid contaminating particles to shift relative to the vesicles of scrubbing liquid.

The process of the invention therefore utilizes the conventional technique for the generation, advantageously at high concentration, of vesicles of scrubbing liquid by pneumatic atomization in the throat of a Venturi. This technique is combined with that of acoustic agglomeration: the vesicles of scrubbing liquid of relatively large diameter are not shifted by the acoustic field and serve as centers of agglomeration for the contaminating particles of very much smaller diameter.

The process of the invention is particularly suitable for the purification of gases contaminated by particles with a diameter of between 0.2 and 20 $\mu$m (monodisperse or polydisperse aerosols), the acoustic agglomeration improving the capture of the particles of small diameter (diameter of less than 5 $\mu$m).

In said process, the scrubbing liquid is advantageously atomized in the form of a monodisperse aerosol whose vesicles have a diameter of between 10 and 1000 $\mu$m, advantageously of the order of 100 $\mu$m. Said diameter is optimized as a function of the characteristics of the treated aerosol. As far as the concentration of said vesicles of scrubbing liquid is concerned, it can be specified here by way of indication that, advantageously, according to the invention, vesicles with a diameter of between 40 and 80 $\mu$m. are generated at a rate of about 5000 per $cm^3$.

Those skilled in the art are capable of adjusting the atomization characteristics so that the mean distance between the generated vesicles is of the order of magnitude of the amplitude of the vibrational movements of the contaminating particles which are due to the acoustic field, said adjustment being necessary to optimize the process of the invention.

The acoustic or sound field generated, according to the invention, at the throat of the Venturi can be generated upstream or downstream of the pneumatic atomization of the scrubbing liquid.

As specified above, the scrubbing vesicles laden with contaminants are entrained by the rising gas stream and are eliminated downstream of the throat of the Venturi, generally downstream of the Venturi itself, which is advantageously extended by an agglomeration chamber, making it possible to increase the residence time of the aerosol (gas+ scrubbing vesicles+contaminating particle) in the sound field.

The elimination of the vesicles must not cause resuspension, in the gas stream, of the contaminating particles trapped in the vesicles of scrubbing liquid. The velocity of the gas stream and/or the shapes of the impingers are optimized for this purpose.

It is advantageous to ensure that, at said impingers, the liquid resulting from the elimination of the vesicles trickles rather than drips.

The technology of the invention–atomization of a scrubbing liquid at the throat of a Venturi+generation of an acoustic field at said throat—has the following advantages:

the contribution of acoustic agglomeration to the stopping power (or efficiency) in terms of the overall incident contamination is small, but it acts essentially on the particle fraction of smallest diameter, for which the scrubber would be ineffective in the absence of the acoustic field. This specific action thus increases the overall efficacy of the apparatus considerably;

it permits the agglomeration of monodisperse aerosols or aerosols with a narrow dispersion, which was impossible with the acoustic agglomerators of the prior art;

during their relaxation time, which is generally of the order of 0.01 s, the centers of agglomeration formed by the vesicles generated by injection at the throat of the Venturi—in a direction more or less perpendicular to that of the gas stream to be purified—have a velocity relative to the gas to be purified. This results in a substantial flow of particles through their agglomeration volume, ensuring a high collision efficacy for a fraction of the residence time in the apparatus (start of said residence time);

control of the flow rate of liquid injected at the throat results in control of the numerical concentration of the coarse particles acting as centers of coagulation, of which the probability of collision, i.e. the velocity of acoustic agglomeration, is a direct function. The possibility of generating a high numerical concentration of centers of agglomeration makes it possible on the one hand to shorten the residence time and on the other to reduce the acoustic intensity applied;

the compactness of the apparatuses and their reduced dimensions compared with the acoustic agglomerators of the prior art enable high frequencies to be used without a notable drop in intensity as a function of the distance from the origin.

The process of the invention, the value of which will already have become apparent to those skilled in the art, is suitable for the purification of gases contaminated by liquid and/or solid particles, it being possible for said gases to be generated in the nuclear industry, chemical industry, car industry, iron and steel industry, etc.

The value of the process of the invention in the nuclear industry will be given very particular emphasis here. In this industry, it is in fact common to be faced with the problem of the separation of liquid aerosols, which constitute the main vehicle of the active contamination of gases to be purified. The efficacy of this separation must be such as to attain the highest possible decontamination factors while at the same time respecting the particular constraints peculiar to equipment working in an active medium. The process of the invention is particularly suitable for the treatment of radioactively contaminated gases such as:

the process gases, the vapors resulting from concentration of the liquid effluents, and the fumes from incineration of active waste (graphite).

As indicated above, it can also be carried out to advantage in the chemical industry (especially for the purification of acid mists contaminated by $H_2SO_4$ or $H_3PO_4$, or gaseous effluents from the dyestuffs industry contaminated by $TiO_2$, $TiSO_4$, $TiCl_4$, etc.), in the iron and steel industry (especially for the purification of fumes from the electric furnaces or brown smoke from the converters), in the car industry (especially for the purification of oil mists or air contaminated by paint aerosols), etc.

The value of the process of the invention in protecting the environment from urban pollution may be mentioned as a further illustration. The process is advantageously used to treat the fumes resulting from the incineration of household refuse or to purify the air for ventilating urban tunnels.

The present invention further relates to a device specially designed for carrying out the process described above.

Said device is a vertical-axis Venturi column of the same type as those of the prior art. It has in particular, in its bottom part, at the throat of a Venturi, means for pneumatic atomization of the scrubbing liquid in the rising stream of the gas to be purified, said means injecting said scrubbing liquid in a direction substantially perpendicular to that of said gas stream, and in its top part, downstream of said throat and generally downstream of the Venturi itself, means for elimination of the vesicles of scrubbing liquid entrained by said gas stream and laden with contaminants.

Characteristically, it also has means for generating a sound or acoustic field at said throat of the Venturi. As indicated above, said sound or acoustic field is intended to cause the contaminating particles—liquid or solid particles of small diameter—to shift relative to the vesicles of scrubbing liquid—of larger diameter—and thus to enable said contaminating particles to be captured by said vesicles.

The means for generating the sound field are located upstream or downstream of the means for atomizing the scrubbing liquid.

The means for eliminating the vesicles of scrubbing liquid laden with contaminants advantageously consist of impingers, the geometry of which causes the impacted vesicles to trickle along walls. Thus an attempt is made to prevent the contaminating particles "trapped" in the vesicles of scrubbing liquid from being freed at the vesicle elimination stage.

In a first variant, the device of the invention has a cylindrical Venturi. More precisely, the plane cross-section of said Venturi, perpendicular to the flow of the gas stream, is circular.

According to the invention, means for generating a sound field are therefore combined with such a Venturi. Said means consist of an acoustic generator, advantageously of the Galton whistle (or "Kurking schok jet") type, mounted in a resonance tube and fed with compressed air. Said resonance tube acts as a nozzle which uses said compressed air, after actuation of the whistle, as a driving gas injected into the throat of the Venturi. Such an arrangement makes it possible to reduce the pressure losses of the Venturi column according to the invention by using the Venturi as an injector. Furthermore, the expansion of the compressed air causes the contaminated gases to cool by mixing with them, which favors enlargement of the contaminating particles by condensation.

In a second, preferred variant of the invention, the device has a non-cylindrical Venturi. Said device is a plane Venturi column with acoustic agglomeration. More precisely, the plane cross-section of the Venturi, perpendicular to the flow of the gas stream, is rectangular. Its length or width is limited by acoustic constraints pertaining to the wavelength used (or to the shape of the sonic generator used). It is for this reason that, according to the flow rate of gas to be treated, the Venturi column of the invention can have one or more identical, plane Venturis mounted in parallel.

Such a geometry gives the column of the invention superior characteristics to those of the Venturi column with a Venturi of circular cross-section, as regards the bulk of the apparatus, the quality of the atomization and the power of the sonic generator. The advantages gained as far as the bulk and atomization quality are concerned are due to the ratio of the area of the cross-section to the diameter (or equivalent diameter), which, while constant in the case of a circle, is an increasing function of the length/width ratio in the case of a rectangle.

According to the invention, means for generating a sound field are therefore combined with such a plane Venturi or such plane Venturis. Said means can consist of different types of acoustic generators.

A series of acoustic generators of the type specified above, namely a Galton whistle or Kurking schok jet, can be combined with each of said Venturis.

In one variant of the invention, it is also possible to equip each Venturi with two vibrating-jet whistles of which the orifices of the resonance volumes may or may not be opposite one another.

In this variant, the throat of the plane Venturi can be provided, upstream or downstream of the scrubbing liquid injection nozzles, with cavities of equal volume which are arranged symmetrically relative to the axial plane of the jet of gas to be purified (symmetrical cavities facing each other) and function like HELMHOLTZ resonators. Said cavities are provided with a knife, enabling them to function like the cavity of a vibrating-jet whistle.

The symmetrical cavities and the throat of the Venturi in the region of the sonic generator have to be separated by partitions which limit the length of the knives to a size which is no greater than the wavelength of the sound emitted by the cavities. In fact, beyond this length, there is a drop in efficiency due to a lack of simultaneity in the breaking of the gas stream on the edge of the knife.

In the case of a conventional whistle, whose plane jet of gas is very thin, a small angular deviation causes substantial pressure variations in the resonance cavity. By contrast, in the case of the sonic generator in question, where the jet of air is relatively thick, the "sensitive" region of the jet, near the knife, is situated in the laminar zone of the flow, in which the velocity is less than the mean delivery velocity. The velocity of the gas circulating in front of the cavity orifice may therefore be insufficient to trigger the resonance.

This disadvantage is overcome by advantageously adding, upstream of said cavities, an exciting device consisting of two parallel rods of circular cross-section, the diameter of which (about 4 mm) is calculated so as to generate Karman vortices with a frequency equal to that of the cavity of the resonators when the velocity at the throat is slightly less than the nominal operating velocity. This exciting device increases the acoustic intensity which would be due to the resonance cavities if they were to be used on their own.

The fact that the orifices of the resonance cavities are opposite one other and are a short distance apart in the gas stream causes synchronization of their frequency by mutual influence. Under these conditions, the variations in pressure loss in the throat of the Venturi in line with these orifices, due to the turbulences caused by the synchronized entry or exit of air at the two orifices, generate, downstream of the generator, a pulsed flow comparable to that of a siren. This pulsed flow enables the nozzles to function in accordance with the same principle as those of vibrating-nozzle atomizers and to generate vesicles of scrubbing liquid whose diameter is controlled better than that of the vesicles obtained by simple pneumatic atomization.

In this same variant of the invention, the acoustic generator can consist of two vibrating-jet whistles of different natural frequency, of which the orifices of the resonance volumes are not opposite one another (cavities of different volume). The consequent increase in the number of frequencies emitted, on account of the harmonics, broadens the active capacity of the process.

The propagation of the sound waves upstream of the generator makes it possible to precondition the contaminating particles. Said sound field causes coagulation of said particles, i.e. an increase in their mean diameter, before they pass through the "filter medium" which is formed, downstream, by the array of scrubbing vesicles suspended in the gas.

Such sonic generators absorb their energy from the gas stream to be purified. Their operation generates pressure losses. These pressure losses are additional to those due to atomizing the scrubbing liquid, bringing it to the required velocity and raising it from the atomization level to the level of the impingers.

Such pressure losses can be at least partially compensated by equipping the Venturi column according to the invention, upstream of the two facing or non- facing whistles, with means for injecting a driving gas, which is advantageously a pressurized gas (pressurized air or vapor) ejected at supersonic velocity. This introduces a small flow of gas at a high velocity.

The necessary flow of driving gas is advantageously controlled by the pressure loss in the apparatus.

Said driving gas also serves to maintain a velocity at the throat which is compatible with the operation of the sonic generator.

There is a further advantage in using a Venturi or Venturis of rectangular cross-section in the Venturi columns of the invention. The geometry of the divergent portion of such Venturis can be optimized so that they function as acoustic flares (thereby optimizing the distribution of the sound field in the coagulation chamber). For this purpose, the cross-section of said divergent portion varies exponentially with the distance from its origin.

The invention will now be described with reference to the attached Figures.

BRIEF DESCRIPTION OF THE DRAWINGS

The characteristics of the process and device of the invention are specified with reference to said Figures without in any way implying a limitation.

FIG. 2 diagrammatically represents an acoustic agglomerator according to the

FIG. 5 shows a Venturi column equipped, according to the invention, with an acoustic agglomerator or sonic generator (2nd variant).

FIG. 6 is a cutaway view along 6—6 of FIG. 5.

Figure 1:
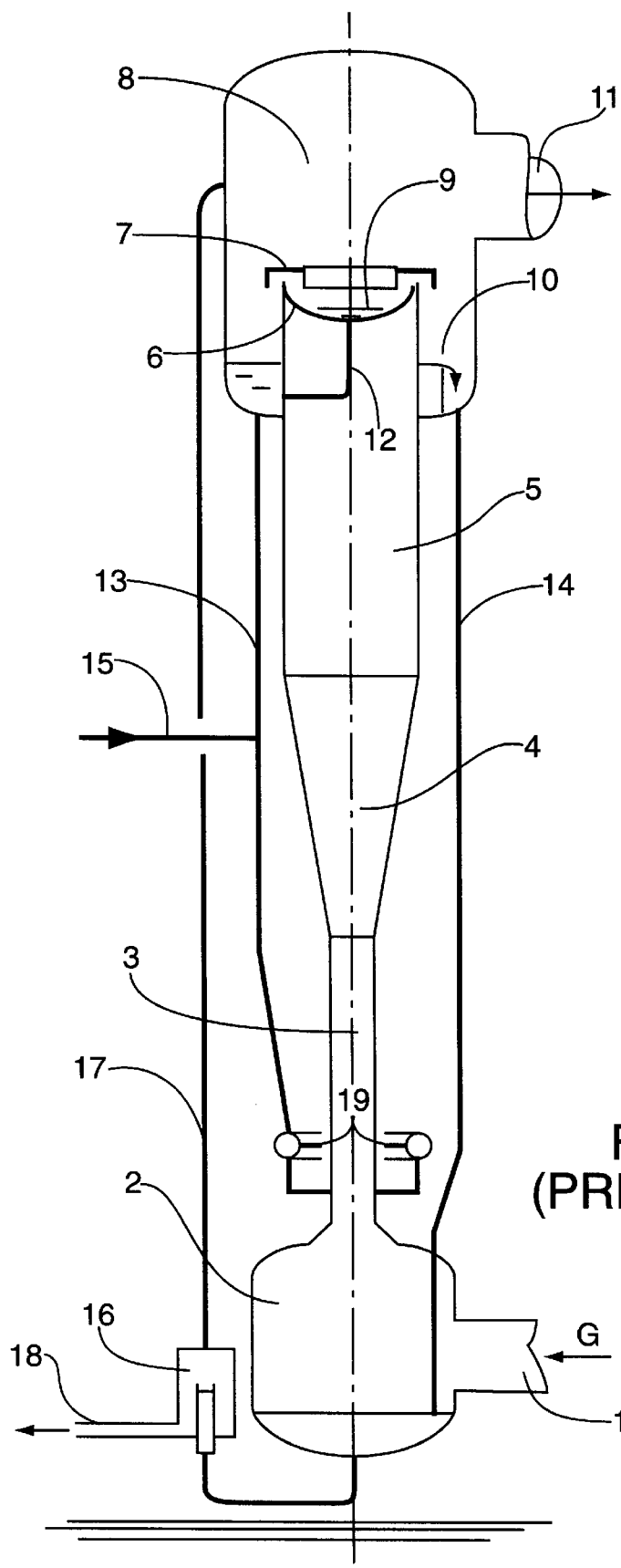
FIG. 1 shows a Venturi column according to the prior art.

The operation of a Venturi column according to the prior art, useful for scrubbing contaminated gases G, is described below with reference to FIG. 1.

Said contaminated gases G enter the reservoir (2) through the tube (1); they then enter the throat (3) of the Venturi, where they generally circulate at a delivery velocity of the order of 80 m/s. This velocity enables them to atomize the scrubbing liquid injected at the entrance of the throat through the injector nozzles (19).

These nozzles are fed with "charge" through the tube (13) from the liquid contained in the lower part of the reservoir (8), the level of which is kept constant by the overflow (10).

This liquid, which is recycled to the injector nozzles (19), originates from elimination of the vesicles from the gases by the impinger of annular cross-section (7).

To limit the concentration of contaminant in the recycled liquid, a make-up flow of scrubbing liquid, the value of which depends on the concentration of contaminant in the treated gases, is mixed with the recycled flow upstream of the nozzles (19); this flow is introduced into the tube (13) via (15). The excess contaminated liquid originating from the overflow (10) flows into the reservoir (2) through the dip tube (14).

The level of the liquid in the lower reservoir (2) is kept constant by the overflow chamber (16), in which the pressure is equilibrated with that in the "roof" of the upper reservoir (8) by the tube (17); the contaminated liquid originating from the overflow chamber (16) is discharged through the tube (18).

In the divergent portion (4), the decrease in the velocity of the gases converts a fraction of their dynamic pressure to static pressure. This divergent portion (4) is extended by the cylindrical volume (5), which increases the contact time of the contaminated gas with the vesicles of scrubbing liquid and favors agglomeration by differential sedimentation.

In the top part of the volume (5), the convergent part of annular cross-section (6) restores the velocity of the gases. Their projection onto the impinger (7) causes the capture of the vesicles produced by the atomization of the scrubbing liquid, which have agglomerated with most of the contaminating particles.

The gas purified by elimination of the vesicles in the impingers escapes into the reservoir (8) and leaves the apparatus through the tube (11). The liquid from vesicle elimination flows into the bottom end of (8), which is connected to the recovery trough (9) by the tube (12).

Figure 2:
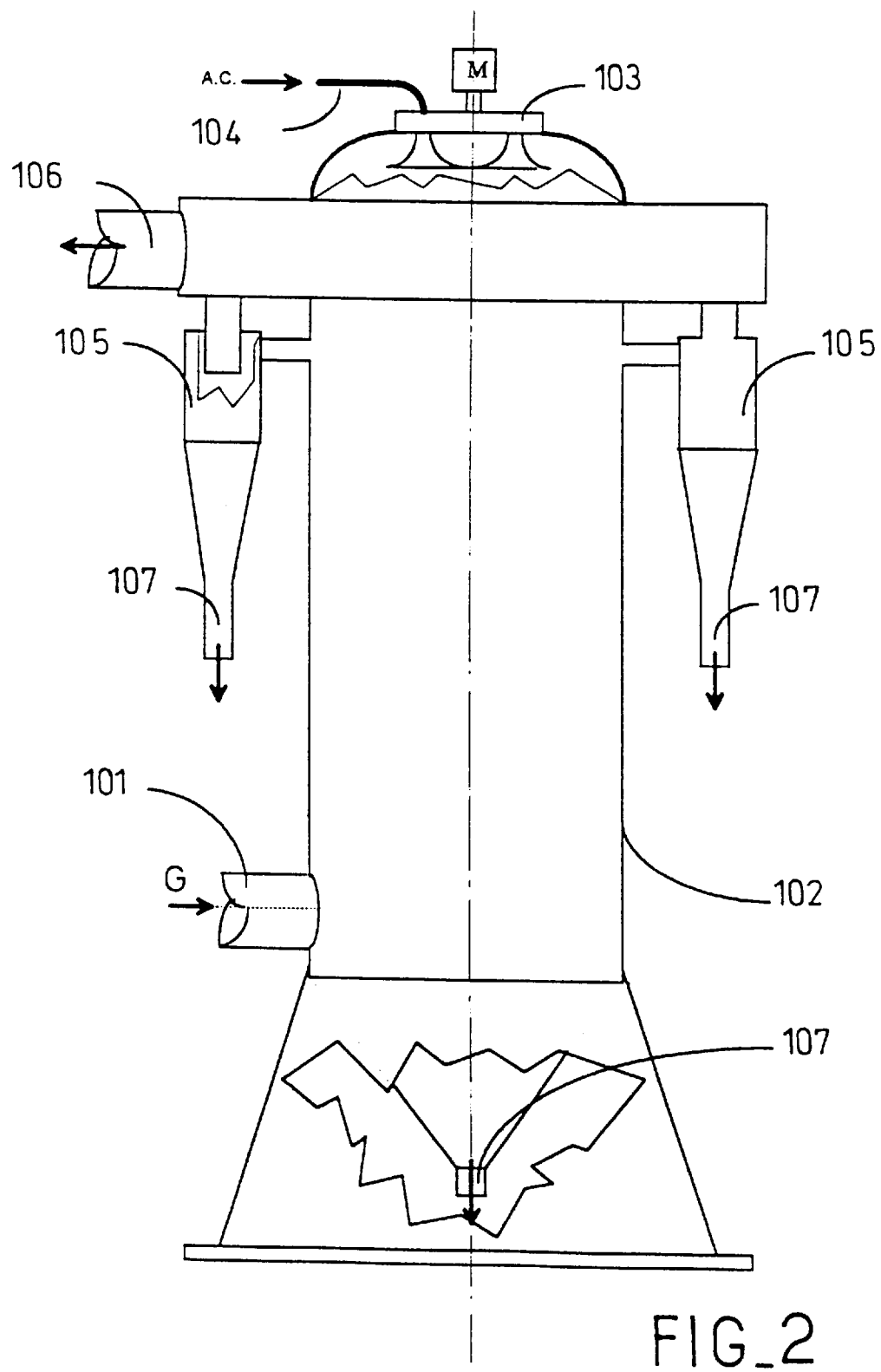

FIG. 2 diagrammatically represents an acoustic agglomerator according to the prior art. It functions in the manner specified below. The contaminated gases G enter a vertical cylindrical reservoir (102) through the tube (101). Said reservoir constitutes the agglomeration chamber for the contaminating particles. Inside said reservoir (102), the gases are subjected to the action of an acoustic wave emitted by the siren (103) fed with compressed air through the tube (104). After acoustic conditioning in said reservoir (102), the gases pass through a dust eliminator, which here consists of a multicyclone comprising n identical cyclones (105).

The purified gases leaving said cyclones (105) escape through the tube (106), while the dusts (or the liquid from vesicle elimination) are discharged through the tubes (107).

DESCRIPTION OF THE PREFERRED EMBODIMENTS

Figure 3:
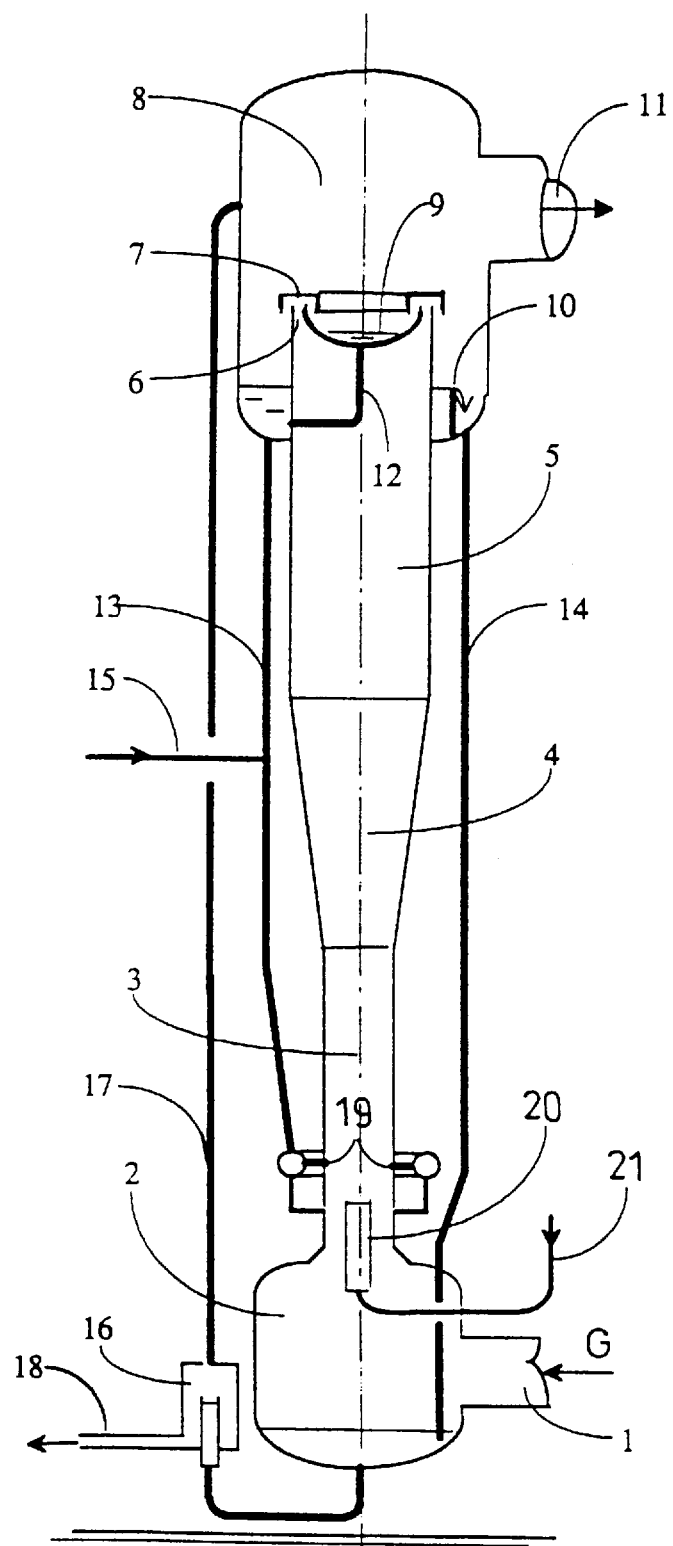
FIG. 3 shows a Venturi column equipped, according to the invention, with an acoustic agglomerator or sonic generator (1st variant).
Figure 4:
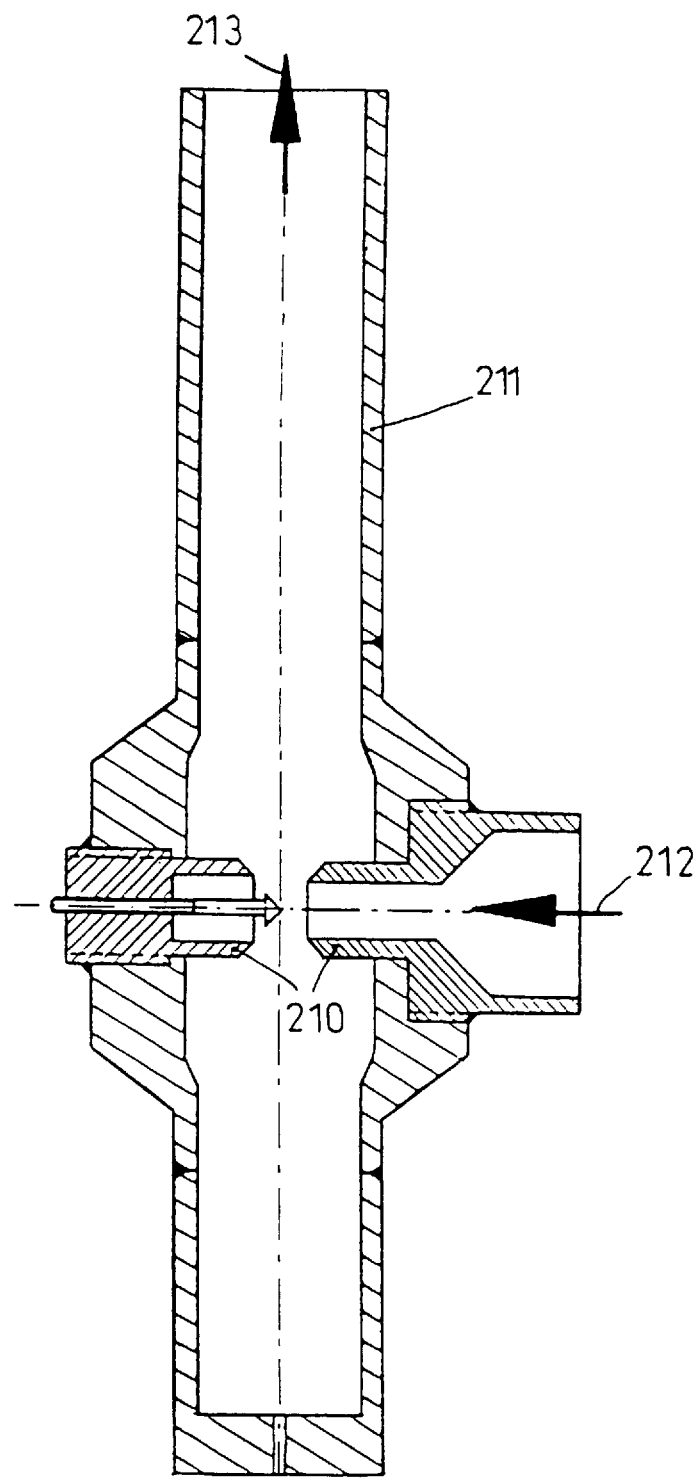
FIG. 4 is a cutaway view of the acoustic agglomerator with which the Venturi column of FIG. 3 is equipped.
Figure 7:
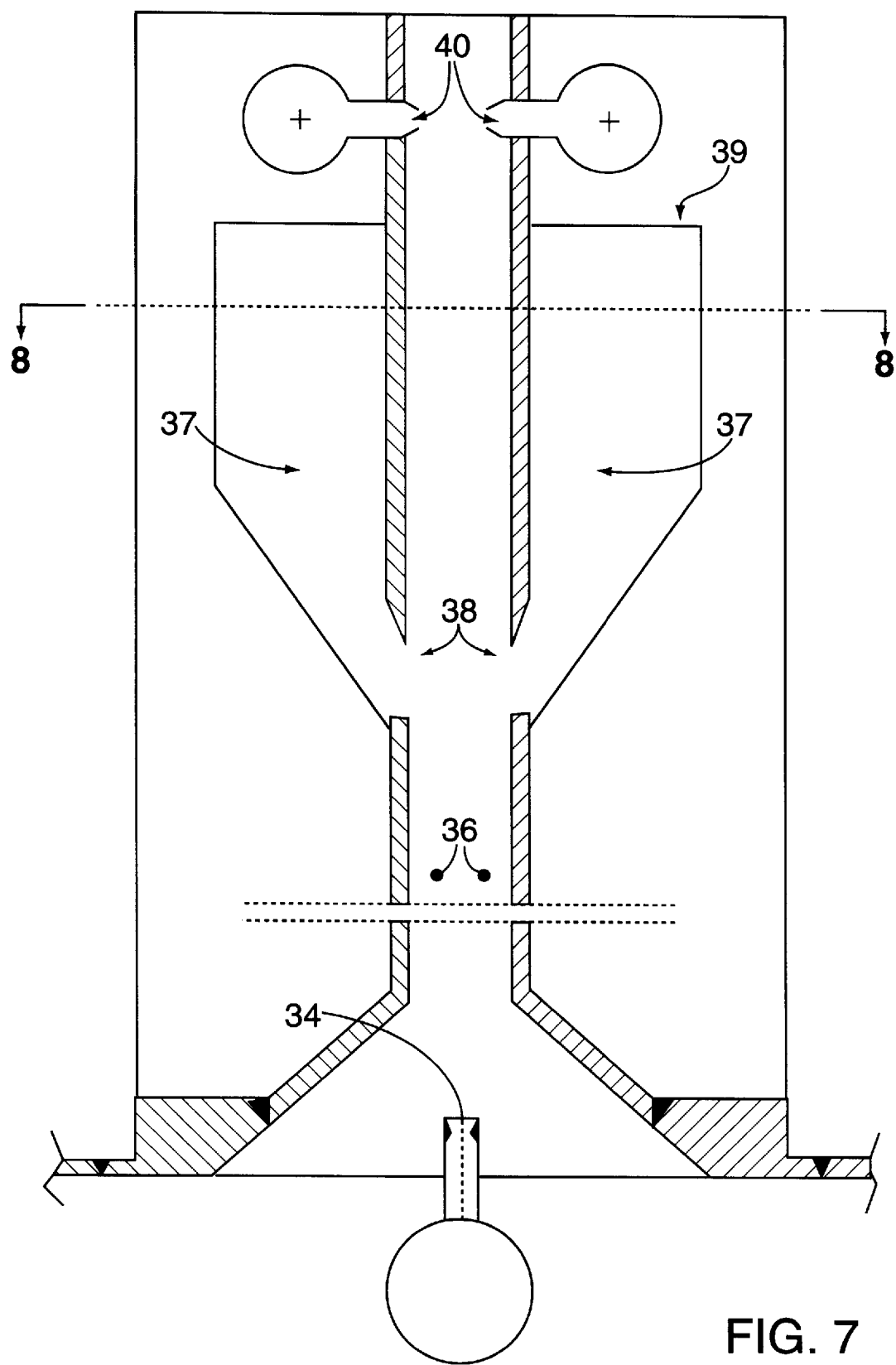
FIG. 7 is an enlarged view of a detail of FIG. 6, namely the sonic generator.
Figure 8:
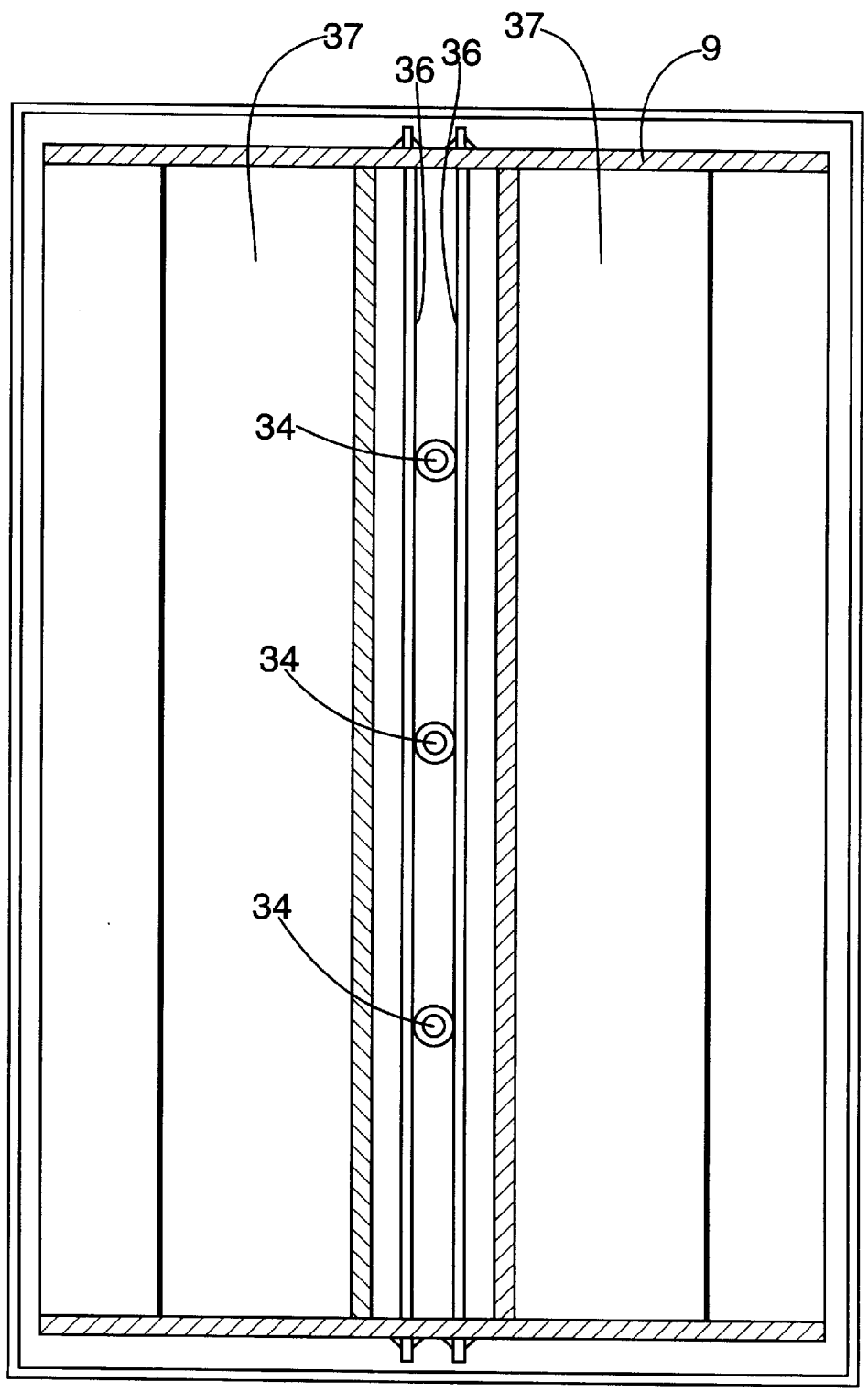
FIG. 8 is a cutaway view of said generator along 8—8 of FIG. 7.

FIGS. 3 and 4 illustrate the first variant of the invention, namely a Venturi column with sonic generator, said Venturi having a circular, plane cross-section (perpendicular to the flow of the gas stream).

Said Venturi column is of the same type as those known according to the prior art. The description of the apparatus and fluid circuit is identical to that given above with reference to FIG. 1.

Said FIGS. 1 and 3 carry the same reference numbers for the same components.

Characteristically, the column of the invention has, upstream of the scrubbing liquid injector nozzles (19), a sonic generator (20) fed with compressed air through the tube (21).

Said sonic generator (20) (or acoustic generator (20)) is shown in detail in

FIG. 4. It consists of a whistle (210) of the Kurking schok jet type, mounted in a resonance tube (211). Compressed air is injected at (212) in order to operate said whistle (210). It is ejected at (213) in the throat (3) of the Venturi. It acts as a driving gas.

FIGS. 5 to 8 illustrate the second variant of the invention, namely a Venturi column with sonic generator, said Venturi having a rectangular, plane cross-section (perpendicular to the flow of the gas stream). This is referred to as a plane Venturi column with sonic agglomerator.

The apparatus represented in the diagram has two Venturis of width L in parallel.

The contaminated gases G enter the lower, horizontal-axis reservoir (32) through the tube (31), said reservoir distributing the flow of said gases uniformly in the throat of the plane Venturis, the lower part (35) of which acts as a mixer for the injector function provided by the Venturis.

The driving gas (compressed air) is injected into the mixer through the nozzles (34), which are equal distances apart on a manifold (33). The kinetic energy produced by the mixing of the driving gas, ejected at supersonic velocity, with the contaminated gas serves to compensate for the pressure losses due to the sonic generator, the atomization, the velocity adjustment and the raising of the scrubbing liquid.

After mixing with the driving gas, the contaminated gases pass through that segment of the throat of the Venturi which is occupied by the sonic generator (39). This generator is described in greater detail a little later on with reference to FIGS. 7 and 8.

The gases leave the segment of the throat occupied by the sonic generator (39) at a "delivery" velocity of the order of 80 m/s and atomize the scrubbing liquid injected through the nozzles (40) to generate vesicles, the diameter of which is advantageously of the order of 60 $\mu$m..

That segment of the throat of the Venturi which is situated downstream of the nozzles (40) serves to mix the aerosol produced by the atomization of the scrubbing liquid with the contaminated gases subjected to the sound waves. The nozzles (40) are fed with "charge", via the manifolds (51) and the tubes (50), from the liquid contained in the lower 30 part of the reservoir (48), whose level is kept constant by the overflow (47). This recycled liquid originates from the elimination of vesicles from the gases by the impingers (44).

To limit the rise in the concentration of contaminant in the recycled liquid, a small make-up flow of scrubbing liquid (the value of which depends on the concentration of contaminant in the treated gases) is mixed with the recycled liquid upstream of the overflows (47); this flow is introduced into the upper reservoir (48) through the dip tube (45).

The excess contaminated liquid originating from the overflows (47) flows into the lower reservoir (32) through the dip tube (52). The level of the liquid in the lower reservoir is kept constant by the overflow chamber (54), in which the pressure is equilibrated with that in the "roof" of the upper reservoir (48) by the tube (53); the contaminated liquid originating from the overflow chamber (54) is discharged through the tube (55).

In the divergent portion (41), which may act as an acoustic flare whose cross-section varies exponentially with the distance from the origin of the divergent portion, the decrease in velocity converts part of the dynamic pressure of the mixture of contaminated gases and driving air to static pressure. The divergent portion is extended by an agglomeration chamber (42) of constant cross-section, which increases the residence time of the aerosol in the sound field.

At the exit of the agglomeration chamber (42), the gases are brought to the required velocity by the convergent portions of rectangular, plane cross-section (43); the projection, onto the impingers (44), of the jets of gas leaving said convergent portions causes the capture of the vesicles produced by the atomization of the scrubbing liquid.

The velocity of impact and the dimensions of the impinger are calculated so as to ensure, with the minimum pressure loss, an efficacy of 100% vis-à-vis the vesicles of scrubbing liquid which have agglomerated with the contaminating particles.

The gas purified by vesicle elimination escapes into the "roof" of the reservoir (48) through the lateral openings in the sides (46) of the impinger plates (44) and leaves the apparatus through the tube (49).

By trickling over the inner face of the sides (46) of the impingers, the liquid from vesicle elimination flows into the lower part of the reservoir (48), which is bounded by the four overflows (47).

The propagation of the sound waves in the reservoir (32), upstream of the generator, enables the latter to be used as a preconditioning volume for the contaminating aerosol. In fact, the sound field prevailing in the reservoir (32) causes coagulation of the contaminating particles, i.e. an increase in their mean diameter, before they pass into the downstream "filter" medium formed by the array of scrubbing vesicles in suspension.

The energy absorbed by the sonic generator (39) is compensated by the energy which is supplied by the injectors consisting of Laval nozzles (34), uniformly distributed under the throat of the plane Venturi.

Said sonic generator (39) consists of the two resonance cavities (37) of equal volume which are arranged symmetrically relative to the axial plane of the jet of gas and function like HELMHOLTZ resonators. Said cavities (37) are each provided with a knife (38). There arc two parallel rods (36) of circular cross- section upstream of said cavities (37). These rods (36) generate Karman vortices. Their diameter is calculated so as to generate such vortices with a frequency equal to that of the cavity of the resonators when the velocity at the throat is slightly less than the nominal operating velocity. Such a device increases the acoustic intensity which would be due to the resonance cavities if they were to be used on their own.

FIGS. 3–4 and 5–7 show two variants of a Venturi column according to the invention, in which the means (20 and 39) for generating the sound field are located upstream of the means (19 and 40) for atomizing the scrubbing liquid.

As indicated in the present description, the possibility that said means for generating the sound field might be located downstream of said means for atomizing the scrubbing liquid is in no way excluded. The finer atomization which can thus be obtained proves particularly advantageous for treating aerosols of low numerical concentration and/or for achieving very high purification levels.

The invention is illustrated by the Example below.

A) We were interested in the purification of a vapor produced by a boiler. Said boiler contains an aqueous solution of a strontium salt. Strontium is used as a tracer. The solution contains 20 g/l thereof.

The boiler, adjusted to a boiling rate of 400 kg/h.m$^2$, produces a vapor laden with liquid particles having a diameter of between 0.2 and 20 $\mu$m. The mass concentration of the liquid particles suspended in the vapor is about $2\times10^{-3}$ g/m$^{3}$.

It is proposed to purify said vapor and quantify the purification by measuring the decontamination factor (DF):

$$DF = \frac{\text{mass of contaminant in the incident gas}}{\text{mass of contaminant in the emergent gas}};$$

mass of contaminant in the incident gas=mass of strontium in the vapor (G) at the entrance of the Venturi column (foot), mass of contaminant in the emergent gas=mass of strontium in the vapor at the exit of the Venturi column (head).

The maximum decontamination factors (DF) detectable by atomic absorption spectrophotometry with the measuring means used are $2\times10^5$ for strontium.

The vapor to be purified has the following characteristics:

| | | | |
|---|---|---|---|
| flow rate (nominal) | Q | 0.173 | kg/s (#1000 $m^3$/h) |
| density | ρg | 0.598 | kg/$m^3$ |
| dynamic viscosity | η | $1.21 \times 10^{-5}$ | Pa · s |
| temperature | θ | 100 | °C. |
| pressure | p | $10^5$ | Pa |

B) Said vapor is treated in a Venturi column equipped with a cylindrical Venturi, as illustrated in FIG. 1.

The characteristics of said column are as follows:

| | |
|---|---|
| Diameter at the throat of the Venturi | $D_C$ = 0.08 m |
| Diameter of the agglomeration chamber | $D_A$ = 0.40 m |
| Height of the agglomeration chamber | $H_A$ = 1 m |
| Overall height of the apparatus | $H_T$ = 3.6 m |

Water (scrubbing liquid) is injected at the throat of the Venturi at a rate of 0.5 kg/$m^3$ of treated vapor. The scrubbing vesicles generated have a diameter of about 350 μm.

The vapor decontamination factor in a Venturi column according to the prior art is DF=300.

We were able to demonstrate the fact that the purification process carried out in this way is ineffective with respect to contaminating particles with a diameter less than or equal to 1.5 μm.

C) Said vapor is treated under the same conditions (same Venturi column, same parameters pertaining to the scrubbing liquid) but with acoustic agglomeration according to the invention (FIG. 3).

The acoustic agglomerator used is a whistle of the Kurking schok jet type with a theoretical acoustic power of 126 W (consumption: 840 W). Said whistle is mounted upstream of the scrubbing liquid atomization nozzles. It is fed with compressed air (2 bar) at a rate of 0.01 kg/s.

The frequency of the generated wave is 3500 Hz.

The acoustic intensity in the agglomeration chamber is 1000 $Wm^2$ (0.1 W/$cm^2$).

The vapor decontamination factor in a Venturi column according to the invention is DF=1000.

I claim:

1. In a process for the purification of a gas (G) contaminated by liquid and/or solid particles, in a vertical-axis Venturi column, comprising, at the throat (3) of a Venturi, the pneumatic atomization of a scrubbing liquid in a rising stream of said gas, said scrubbing liquid being injected in a direction substantially perpendicular to that of said stream, and, downstream of said throat, the elimination of the vesicles of scrubbing liquid entrained by said gas stream and laden with contaminants, the improvement which comprises generating a sound field at said throat (3) of the Venturi in order to cause the contaminating particles to shift relative to the vesicles of scrubbing liquid.

2. A process according to claim 1 characterized in that the contaminating particles have a diameter of between 0.2 and 20 μm and in that the scrubbing liquid is atomized at the throat (3) of the Venturi in the form of a monodisperse aerosol whose vesicles have a diameter of between 10 and 1000 μm.

3. A process according to characterized in that the sound field is generated upstream of the pneumatic atomization of the scrubbing liquid.

4. A process according to any one of claims 1 characterized in that the vesicles of scrubbing liquid laden with contaminating particles are eliminated at the head of the Venturi column by impact on an impinger having walls, said impact causing said scrubbing liquid to trickle along the walls of the impinger.

5. In a vertical-axis Venturi column useful for the purification of a gas (G) contaminated by liquid and/or solid particles, having, in its bottom part, at the throat (3) of a Venturi, means (19) for pneumatic atomization of a scrubbing liquid in a rising stream of the gas to be purified, said means (19) injecting said scrubbing liquid in a direction substantially perpendicular to that of said gas stream to be purified, and in its top part, downstream of said throat (3), means (7) for elimination of the vesicles of scrubbing liquid entrained by said gas stream and laden with contaminants, the improvement which comprises means (20) for generating a sound field at said throat, said sound field being intended to cause the contaminating particles to shift relative to the vesicles of scrubbing liquid.

6. A Venturi column according to claim 5 characterized in that the means (20) for generating the sound field are upstream of the means (19) for atomizing the scrubbing liquid.

7. A Venturi column according to claim 5 characterized in that the vesicle-eliminating means are impingers (7), the geometry of which causes the impacted vesicles to trickle along walls.

8. A Venturi column according claim 5 characterized in that the Venturi has a circular, plane cross-section perpendicular to the flow of the gas stream.

9. A Venturi column according to claim 8 characterized in that it has an acoustic generator (20), fed with compressed air (212) and mounted in a resonance tube (211), said resonance tube acting as a nozzle which uses said compressed air (212) as a driving gas injected into the throat (3) of the Venturi.

10. A Venturi column according to claim 5 characterized in that it contains one or more identical Venturis of rectangular, plane cross-section perpendicular to the flow of the gas stream, said Venturis being mounted in parallel.

11. A Venturi column according to claim 10 characterized in that each Venturi has a series of acoustic generators (20) fed with compressed air (212) and mounted in a resonance tube (211), said resonance tube acting as a nozzle which uses said compressed air (212) as a driving gas infected into the throat (3) of the Venturi.

12. A Venturi column according to claim 10 characterized in that each Venturi is equipped with two vibrating-jet whistles (39); rods (36), which generate Karman vortices, advantageously being located upstream of the resonance volumes (37) of said vibrating-jet whistles (39).

13. A Venturi column according to claim 12 characterized in that, upstream of said whistles (39), it is equipped with means (34) for injecting a driving gas, said driving gas being mixed with the gas to be purified and at least partially compensating for the pressure losses generated especially by the sonic generator (39).

14. A Venturi column according claim 13 characterized in that the divergent portion (41) of each Venturi has a cross-section which varies exponentially with the distance from the origin of said divergent portion (41) so as to act as an acoustic flare.

15. A Venturi column according to claim 9 wherein said acoustic generator (20) is a Galton whistle type (210) acoustic generator.

16. A Venturi column according to claim 11 wherein said acoustic generator (20) is a Galton whistle type (210) acoustic generator.

* * * * *